(12) United States Patent
Wilson et al.

(10) Patent No.: US 7,574,683 B2
(45) Date of Patent: Aug. 11, 2009

(54) AUTOMATING POWER DOMAINS IN ELECTRONIC DESIGN AUTOMATION

(76) Inventors: John Wilson, 19 Kelsey Avenue, Wokingham, Berkshire RG40 4TZ (GB); Haytham Mohamed Salah Hedeya, 2 Shaar st., Ard El Basry, Maadi, Cairo (EG) 11431; Mohamed AbdelKader Hussein, 9 st. 257, Maadi, Cairo (EG) 11435

( * ) Notice: Subject to any disclaimer, the term of this patent is extended or adjusted under 35 U.S.C. 154(b) by 301 days.

(21) Appl. No.: 11/499,036

(22) Filed: Aug. 4, 2006

(65) Prior Publication Data

US 2007/0044044 A1 Feb. 22, 2007

Related U.S. Application Data

(60) Provisional application No. 60/706,188, filed on Aug. 5, 2005.

(51) Int. Cl.
*G06F 17/50* (2006.01)
(52) U.S. Cl. .............................. 716/5; 716/11
(58) Field of Classification Search .................... 716/5, 716/11, 16–17
See application file for complete search history.

(56) References Cited

U.S. PATENT DOCUMENTS

| | | | |
|---|---|---|---|
| 6,179,488 B1 | 1/2001 | Wilson | |
| 6,470,481 B2 | 10/2002 | Brouhard et al. | |
| 6,725,430 B2 * | 4/2004 | Draxler et al. | 716/1 |
| 6,757,882 B2 | 6/2004 | Chen et al. | |
| 6,833,634 B1 | 12/2004 | Price | |
| 7,000,214 B2 * | 2/2006 | Iadanza et al. | 716/18 |
| 7,103,862 B2 * | 9/2006 | Sung et al. | 716/5 |
| 7,146,303 B2 * | 12/2006 | Roy et al. | 703/18 |
| 7,152,216 B2 * | 12/2006 | Kapoor et al. | 716/4 |
| 7,353,467 B2 * | 4/2008 | Robertson et al. | 716/1 |
| 7,367,006 B1 * | 4/2008 | O'Riordan et al. | 716/11 |
| 2002/0095644 A1 * | 7/2002 | Weiss | 716/3 |
| 2002/0120909 A1 | 8/2002 | Brouhard et al. | |
| 2003/0005396 A1 | 1/2003 | Chen et al. | |
| 2003/0009658 A1 | 1/2003 | Chen et al. | |

(Continued)

OTHER PUBLICATIONS

Flynn, "Design and evaluation of power-efficient SoCs," *EETimes* <http://www.eetimes.com/showArticle.jhtml?articleID=18310592>, 3 pages, dated Jan. 22, 2004.

*Primary Examiner*—Stacy A Whitmore
(74) *Attorney, Agent, or Firm*—Klarquist Sparkman, LLP

(57) ABSTRACT

One or more portions of the design (e.g., components, channels, or portions thereof) can be assigned instances of one or more component power domains (CPDs). Assigning an instance of a CPD to a design element (or to a portion thereof) can indicate, for example, whether the element can be switched on and off, or whether the element can operate over a range of voltages. The CPD instances can, in turn, be assigned to one or more design power domains (DPDs). Assignments of a CPD to a DPD can be evaluated according to a set of compatibility rules. Two or more electronic design elements can be connected by one or more signal paths. Organizing the CPD instances into DPDs can aid in finding signal paths that cross from a first DPD to a second DPD. To improve the reliability of signal paths traversing a DPD boundary, one or more power domain interface (PDI) components can be created to handle the signal paths at the boundary.

20 Claims, 13 Drawing Sheets

U.S. PATENT DOCUMENTS

| | | | |
|---|---|---|---|
| 2003/0009730 A1 | 1/2003 | Chen et al. | |
| 2003/0061588 A1* | 3/2003 | Williams | 716/12 |
| 2003/0097641 A1* | 5/2003 | Wachi | 716/1 |
| 2003/0101418 A1* | 5/2003 | Draxler et al. | 716/1 |
| 2003/0135830 A1* | 7/2003 | Buffet et al. | 716/4 |
| 2004/0216066 A1* | 10/2004 | Chaudhari | 716/8 |
| 2004/0268278 A1* | 12/2004 | Hoberman et al. | 716/5 |
| 2005/0108667 A1* | 5/2005 | Iadanza et al. | 716/4 |
| 2005/0216872 A1* | 9/2005 | Sung et al. | 716/5 |
| 2005/0240891 A1* | 10/2005 | Just et al. | 716/10 |
| 2005/0268258 A1* | 12/2005 | Decker | 716/4 |
| 2006/0085770 A1* | 4/2006 | Kapoor et al. | 716/4 |
| 2006/0112376 A1* | 5/2006 | Broberg et al. | 717/136 |
| 2006/0117282 A1* | 6/2006 | Frenkil | 716/5 |
| 2006/0123365 A1* | 6/2006 | Hoberman et al. | 716/4 |
| 2006/0123368 A1* | 6/2006 | Pineda De Gyvez et al. | 716/6 |
| 2006/0184904 A1* | 8/2006 | Murgai et al. | 716/4 |
| 2006/0184905 A1* | 8/2006 | Floyd et al. | 716/5 |
| 2006/0225020 A1* | 10/2006 | Chandrakasan et al. | 716/17 |
| 2006/0230377 A1* | 10/2006 | Rapp et al. | 716/18 |
| 2007/0044044 A1* | 2/2007 | Wilson et al. | 716/1 |
| 2007/0235766 A1* | 10/2007 | Kojima et al. | 257/208 |
| 2008/0052654 A1* | 2/2008 | Rahmat et al. | 716/6 |
| 2008/0098338 A1* | 4/2008 | Kapoor et al. | 716/5 |

* cited by examiner

```xml
<?xml version+"1.0" encoding+UTF-8"?>
<powerDomains>
    <powerDomain name="amba">
        <scalable min="2.2" max="5.5">true</scalable>
        <switchable>true</switchable>
        <busInterfaces>
            <busInterface name="ambaAHB"/>
        </busInterfaces>
        <signals>
            <signal>DBGEN</signal>
            <signal>DBGEXT</signal>
            <signal>DBGSDOUT</signal>
            <signal>
        </signals>
    </powerDomain>
    <powerDomain name="vpb">
        <scalable min="0" max="0">false</scalable>
        <switchable>false</switchable>
        <busInterfaces>
            <busInterface name="armInterrupt"/>
        </busInterfaces>
    </powerDomain>
</powerDomains>
```

FIG. 3

910 {
```
<externalSignals>
    <!-- list of external signals (in addition to transmission signals)
    to be added to the PDI component -->
    <IPin name="control1" mode="in"/>
    <IPin name="testClock" mode="in"/>
    <IPin name="testStatus" mode="out"/>
</externalSignals>
```

920 {
```
<code decl="true/false">
    signal controlOut : std_logic; -- an internal logic signal <!-- HDL Code snippets that appear in the declarative or
    execution sections of the HDI --> dff : dff1 ( clk => testClock, d=> control1, q=> controlOut);
    testStatus <= controlOut and control1;
</code>
```

930 {
```
<transmission> <!-- one of this section only – the results are
replicated for every transmission signal pair -->
    <IPin name="transmissionOut"/> <= <Ipin
Name="transmissionIn"/> when controlOut = "1" else "0";
</transmission>
```

AUTOMATING POWER DOMAINS IN ELECTRONIC DESIGN AUTOMATION

CROSS REFERENCE TO RELATED APPLICATIONS

This application claims the benefit of U.S. Provisional Patent Application No. 60/706,188, titled "Automating Power Domain," filed Aug. 5, 2005, which is incorporated herein by reference.

TECHNICAL FIELD

This disclosure relates to electronic design automation tools.

BACKGROUND

Power consumption in an integrated circuit (IC) can be a factor in IC design. For example, increases in complexity and speed of IC designs can outstrip the benefits of advances such as voltage reduction and feature size scaling. Given higher clock rates and larger die sizes, power dissipation can, in some cases, become a limiting factor of performance in IC designs, e.g., in system-on-chip (SoC) designs.

One approach to managing power consumption in an IC is to design some areas of the chip to be "turned off" or otherwise consume less power. For example, a processor in a TV or other device can be designed to turn off selected areas of the processor when in a "standby" mode, while another area of the processor monitors for a "wake-up" call, e.g., from a remote control. In another example, a processor in a computer can run at full power when executing a processing-intensive task, and scale down the power used by the chip when executing a less-demanding task.

SUMMARY

To aid power management in an IC design, one or more portions of the design (e.g., components, channels, or portions thereof) can be assigned instances of one or more component power domains (CPDs). Assigning an instance of a CPD to a design element (or to a portion thereof) can indicate, for example, whether the element can be switched on and off, or whether the element can operate over a range of voltages. The CPD instances can, in turn, be assigned to one or more design power domains (DPDs). Two or more electronic design elements can be connected by one or more signal paths. Organizing the CPD instances into DPDs can aid in finding signal paths that cross from a first DPD to a second DPD. To improve the reliability of signal paths traversing a DPD boundary, one or more power domain interface (PDI) components can be created to handle the signal paths at the boundary. The PDI components themselves can be wrapped (e.g., in a hardware description language (HDL) file) to aid incorporating the PDI components into the design.

The disclosed technologies can aid in addressing power management issues at a high-level stage in an IC design process (although the disclosed technologies are not limited to any particular stage or stages of the design process), and at least some of the steps can be automated. This can make incorporating power domains into IC designs faster and more efficient.

One embodiment comprises, in a method for an electronic circuit design comprised of one or more circuit design elements, receiving a first set of assignments based on one or more descriptors of the one or more circuit design elements in the electronic circuit design, the first set comprising one or more assignments of instances of a first set of power domains to one or more of the circuit design elements, receiving a second set of assignments comprising one or more assignments of the instances to a second set of power domains, applying one or more compatibility rules to the second set of assignments, and identifying one or more power domain boundaries in the circuit design based on the second set of assignments. Some embodiments further comprise creating, according to one or more templates, one or more boundary circuit design elements for handling one or more transmission signals crossing from a first member of the second set of power domains to a second member of the second set of power domains. Creating one or more boundary circuit design elements can comprise instantiating in the electronic design transmission gate logic for the one or more transmission signals, and instantiating in the electronic design one or more blocks of control logic. In further embodiments, the first set of power domains comprises a default power domain. In additional embodiments, the second set of power domains comprises a default power domain. In some embodiments, the default power domain is a switchable and a scaleable power domain. In other embodiments, the first set of power domains has one or more switchability indicators and the second set of power domains has one or more switchability indicators, and applying one or more compatibility rules comprises comparing at least one switchability indicator of the second set of power domains with at least one switchability indicator of the first set of power domains. In another embodiment, the first set of power domains has one or more voltage range indicators and the second set of power domains has one or more voltage range indicators, and applying one or more compatibility rules comprises comparing at least one voltage range indicator of the second set of power domains with at least one voltage indicator of the first set of power domains. An integrated circuit can be made according to one or more of the above methods.

In another embodiment, a computer-readable storage medium containing a data structure describing a power domain for an element in an electronic design, the data structure comprising: indicators of one or more bus interfaces associated with the power domain; indicators of one or more signals associated with the power domain; a scalability indicator indicating whether a power domain voltage can be scaled; and a switchability indicator indicating whether the power domain can be switched on and off. The data structure can be described using a mark-up language. In some embodiments, the scalability indicator comprises an approximate minimum voltage for the power domain and an approximate maximum voltage for the power domain. The approximate minimum voltage for the power domain and an approximate maximum voltage for the power domain are approximately equal. The data structure can further comprise a power domain name.

In an additional embodiment, a system for performing electronic design automation comprises a processor and a computer-readable medium comprising instructions for performing a method, the method comprising receiving a first set of assignments based on one or more descriptors of one or more circuit design elements in the electronic circuit design, the first set comprising one or more assignments of instances of a first set of power domains to one or more of the circuit design elements, receiving a second set of assignments comprising one or more assignments of the instances to a second set of power domains, applying one or more compatibility rules to the second set of assignments, and identifying one or more power domain boundaries in the circuit design based on the second set of assignments. In some embodiments, the method further comprises creating, according to one or more templates, one or more boundary circuit design elements for handling one or more signals crossing from a first member of the second set of power domains to a second member of the second set of power domains. Creating one or more boundary circuit design elements can comprise receiving one or more indications of the one or more common boundaries, receiving a selection of a template, the template comprising signal connection information, generating transmission gate logic for at least some of the one or more signals at the common boundaries, and generating control logic. The template can be provided in a mark-up language description. In some embodiments, the method further comprises inserting into the electronic design the one or more boundary circuit design elements.

Additional features and advantages will become apparent from the following detailed description of illustrated embodiments, which proceeds with reference to the accompanying drawings.

BRIEF DESCRIPTION OF THE DRAWINGS

FIG. 3 shows an example of an extensible mark-up language (XML) passage that describes CPD information.

FIG. 9 shows one embodiment of a description of a template for generating a PDI component.

DETAILED DESCRIPTION

Figure 1:
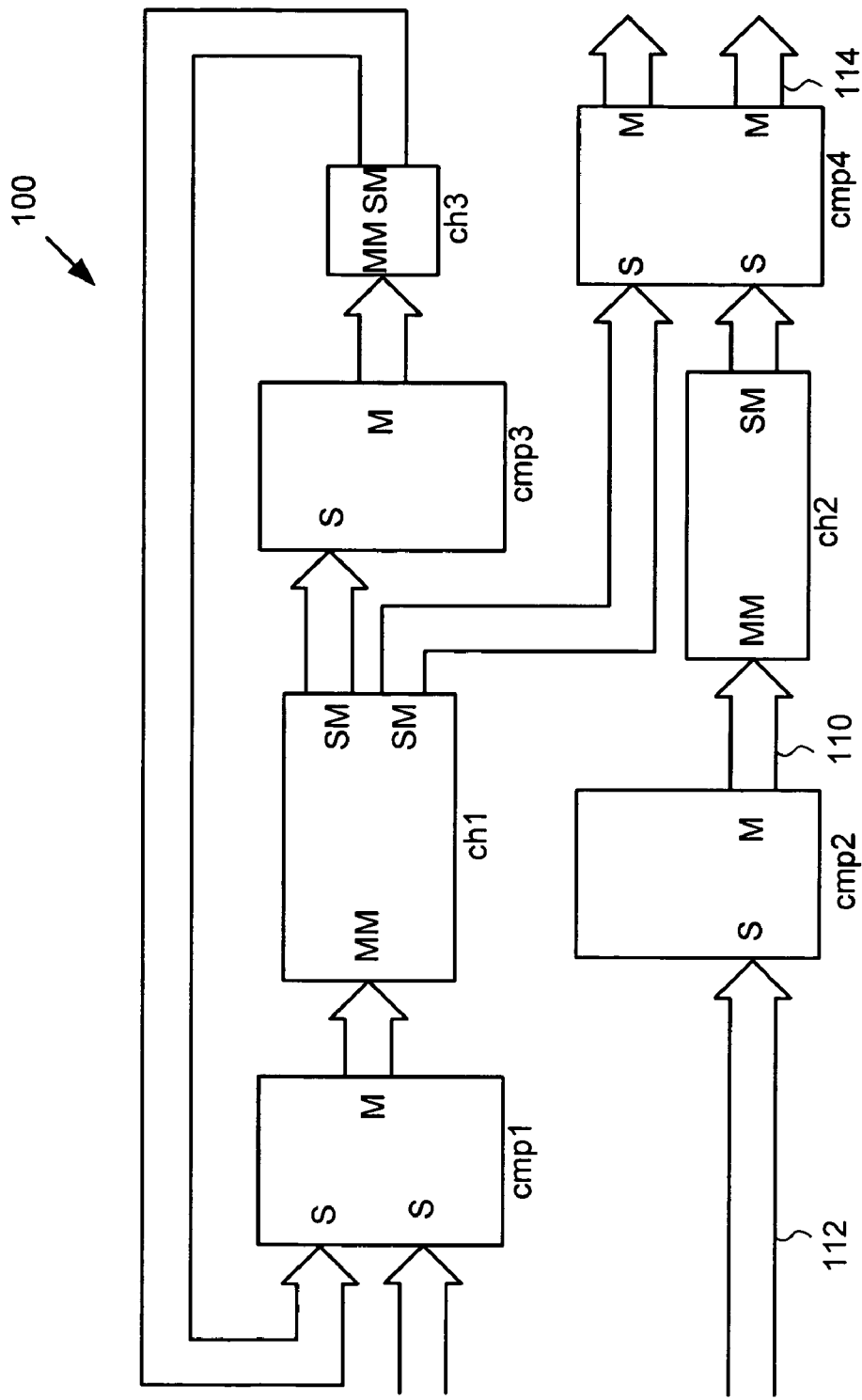
FIG. 1 shows a block diagram of an exemplary embodiment of an electronic circuit design.

The disclosed technologies are directed toward novel and unobvious features and aspects of the embodiments of the system and methods described herein. The disclosed features and aspects of the embodiments can be used alone or in various novel and unobvious combinations and sub-combinations with one another.

Although the operations of the disclosed methods are described in a particular, sequential order for convenient presentation, it should be understood that this manner of description encompasses rearrangements, unless a particular ordering is required by specific language set forth below. For example, operations described sequentially can in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "provide" or "determine" to describe the disclosed methods. Such terms are high-level abstractions of the actual operations that are performed. The actual operations that correspond to these terms will vary depending on the particular implementation and are readily discernible by one of ordinary skill in the art.

Some of the methods described herein can be implemented in software stored on a computer-readable medium and executed on a computer. Some of the disclosed methods, for example, can be implemented as part of an electronic design automation (EDA) tool. Such methods can be executed on a single computer or on a networked computer. For clarity, only those aspects of the software germane to these disclosed methods are described; product details well-known in the art are omitted. For the same reason, the computer hardware is not described in detail.

Exemplary Electronic Design Elements

Some embodiments of the disclosed technology can be implemented with electronic circuit designs comprised of one or more circuit design elements. In some embodiments, one type of element is a component, sometimes also referred to as an "intellectual property block" or an "IP block." Components can comprise input and output interfaces, and (as is explained below) they can also comprise additional components. In some embodiments, another type of element is a type of bus called a channel. Signals, such as individual signals and/or signal buses, can be carried to or from a component using a channel.

As is well known in the art, an electronic design can be represented in a number of ways at a number of different abstraction levels. In some embodiments, an electronic design can be converted from a higher-level representation (e.g., a high-level representation in a hardware description language (HDL)) to one or more lower-level representation, e.g., a transistor-level representation. An electronic design can also be prepared for fabrication and then fabricated into an actual semiconductor product.

In some embodiments, an EDA tool can create a hierarchical component (HC) by creating an abstraction of one or more other components and/or channels. For example, an HC can be created by "packaging" several components together, such that an EDA tool user can treat the several components, at least in some circumstances, as a unitary component. Accordingly, components and channels can themselves be HCs comprised of one or more components and/or channels.

In further embodiments, an EDA tool can create and/or use one or more ad-hoc components. An ad-hoc component is a component that does not have an interface that is consistent with one or more other component interfaces in a design.

FIG. 1 is a block diagram of an exemplary embodiment of an electronic design 100. The design 100 comprises components cmp1, cmp2, cmp3, and cmp4, as well as channels ch1, ch2 and ch3. Data connections between the components and channels are indicated in FIG. 1 by thick arrows. For example, the arrow 110 indicates a data connection between the component cmp2 and the channel ch2. Arrows that have one end not connected to a component or channel indicate data connections with elements external to the design 100. For example, the arrow 112 indicates one or more input signals entering cmp2 from outside of the design 100, while arrow 114 indicates one or more output signals from cmp4 to an element outside of the design 100.

In some embodiments, components can be configured with various interfaces. For example, the components in FIG. 1 can comprise one or more "controller" interfaces (also called "master" interfaces, sometimes indicated in this application by "M") and one or more controlled interfaces (also called "slave" interfaces, sometimes indicated in this application by "S"). Generally, controller interfaces handle output signals or buses, while controlled interfaces handle input signals or buses. For example, the component cmp1 of FIG. 1 comprises two controlled interfaces and one controller interface, as indicated by the labels "S" and "M" on the component cmp1.

In further embodiments, channels can similarly be configured with one or more interfaces. For example, the individual channels in FIG. 1 can comprise one or more "controller mirror" interfaces (also called "master mirror" interfaces, sometimes indicated in this application by "MM") and one or more "controlled mirror" interfaces (also called "slave mirror" interfaces, sometimes indicated in this application by "SM"). Generally, a controller mirror interface receives one or more signals or buses from a controller interface on a component, while a controlled mirror interface provides one or more signals or buses to a controlled interface on a component. For example, the channel ch1 in FIG. 1 comprises a controller mirror interface (MM) coupled to a controller interface on the component cmp1. The channel ch1 further comprises two controlled mirror interfaces (SM) coupled to a controlled interface on the component cmp3 and to the controlled interface (S) on the component cmp4. In some embodiments, a controlled interface (S) can be configured to act as a controller interface for another controlled interface.

Exemplary Embodiments of Power Domains

A "power domain" is a logical organization of one or more elements of an electronic design, such as a component and/or channel, a portion of a component and/or channel, or combinations of several components and/or channels. A component power domain (CPD) can be assigned to one or more components, channels, and/or portions thereof. A particular assignment of a CPD to a component or channel is referred to as an "instance" of the CPD. A CPD can comprise a set of properties. For example, in some embodiments a CPD comprises: a list of one or more bus interfaces that belong to the CPD; a list of one or more signals that belong to the CPD; minimum and maximum voltage information for the CPD; and whether the CPD can be switched on and off. For the purposes of this application, a signal or bus interface "belongs" to a CPD if the CPD contains information regarding handling the signal or bus interface.

The power consumption of a power domain can be controlled several ways. In some embodiments, power consumption is controlled by scaling the voltage used by elements associated with the power domain. For example, to reduce power consumption, the voltage provided to elements in a given power domain can be reduced from a first level to a second, lower lever, e.g., changed from 5.5V to 2.2V, or to one or more voltage values in between these values. (Generally speaking, voltage values can be selected according to design constraints of a particular component or electronic design.) In other embodiments consumption can be controlled by switching elements associated with the domain on or off as desired. Further embodiments can use one or more combinations of these techniques. (For the purposes of this application, statements such as "scaling the voltage of a power domain," or "turning a power domain on or off" refer to actions carried out on elements associated with the power domain.)

Figure 2:
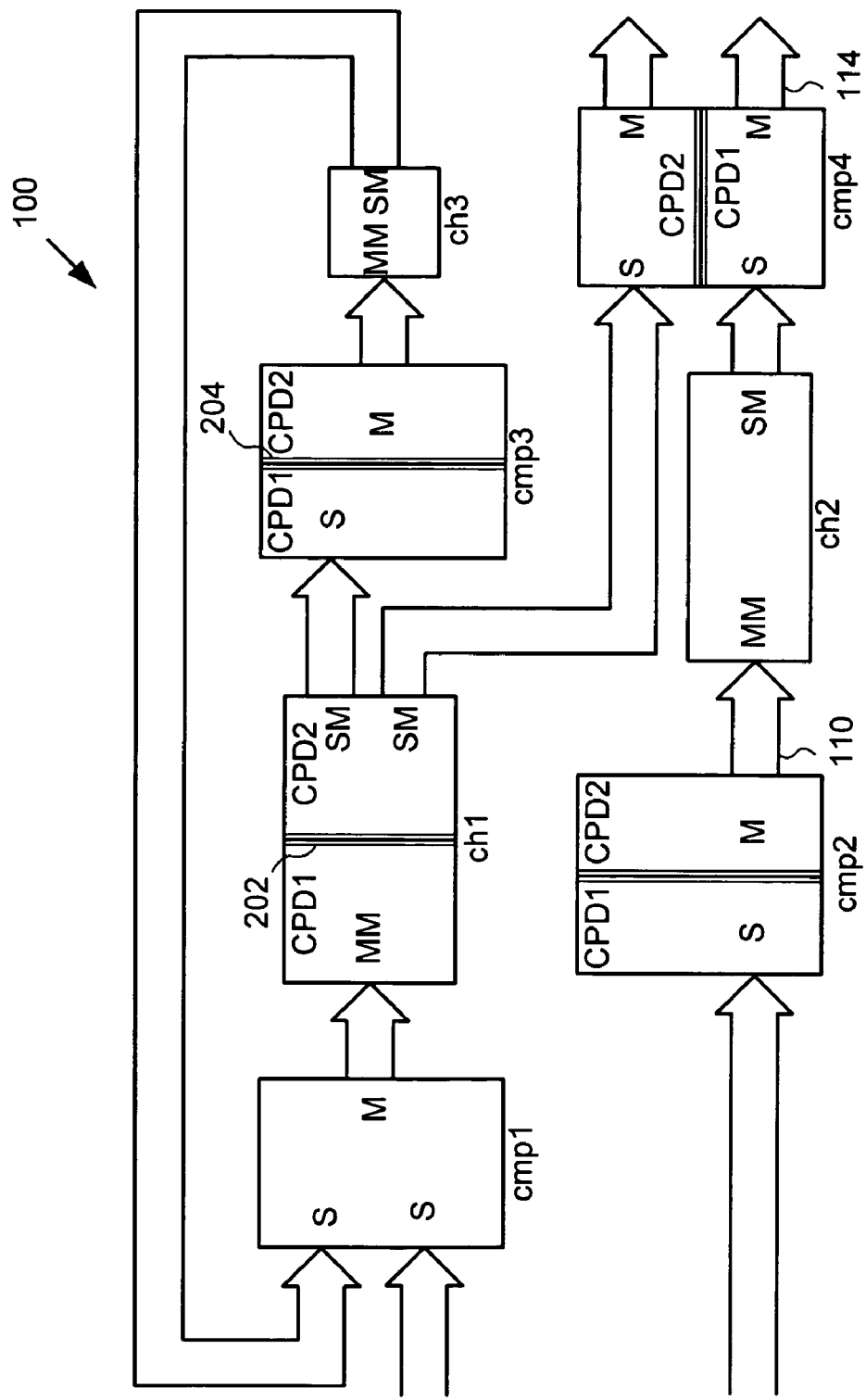
FIG. 2 shows an example of the circuit design 100 of FIG. 1 with CPDs assigned to some components and channels.

FIG. 2 shows an example of the electronic circuit design 100 of FIG. 1 with CPD instances assigned to some components and channels. For example an instance of the component power domain CPD1 is assigned to the MM interface of channel ch1, and an instance of the component power domain CPD2 is assigned to the SM interfaces of channel ch1. Similarly, component cmp4 has a first M interface and a first S interface assigned to CPD1, as well as a second M interface and a second S interface assigned to CPD2. In the figures of this application, a thin-thick-thin line (e.g., line 202 on channel ch1, or line 204 on component cmp3) indicates an interface within a component or channel between two or more component power domains. In some embodiments such interfaces can occur because of the hierarchical nature of electronic designs.

In some embodiments, not all elements have one or more CPD instances explicitly to them. For example, in FIG. 2 component cmp1 and channels ch2, ch3 do not have CPD instances explicitly assigned to them. One or more components and channels such as these can have a default CPD assigned to them, or the elements can have no CPD assigned to them.

In some embodiments, an instance of a CPD can be assigned to an element by providing CPD information in a descriptor of the element. This description can be provided in a number of formats well known to those of ordinary skill in the art. For example, the description can be provided in one or more data structures. In some embodiments, the data structures can be stored in a mark-up language such as XML. FIG. 3 provides an example of an XML passage 300 that can be included in an element description to provide CPD information for two CPDs, "amba" and "vpb." For a CPD associated with the element, the exemplary description can comprise:
  a name tag 302, 304;
  a list of bus interfaces 306, 308 that belong to the named CPD;
  a list of signals 310 in the element that belong to the CPD;
  a scalability indicator 312, 314, such as comprising a Boolean value and a voltage range; and
  a switchability indicator 316, 318, which can also comprise a Boolean value.

The scalability indicator can indicate that a range of voltages is supported by the CPD. The voltage range provided in the scalability indicator can be stated in relative and/or absolute values and can comprise a minimum and maximum voltage value supported by the CPD. In some embodiments, if the Boolean value for the scalability indicator states that the CPD is not scalable, the voltage range can be omitted for the CPD. The switchability indicator can indicate that the CPD can be switched off.

Some embodiments do not require a description to contain all of the information listed above. For example, a list of bus interfaces or a list of component signals can be omitted from a description of a given CPD. If CPD information is not provided for a signal or bus interface in a component or channel, a default CPD can be assigned to the signal or bus interface, or no CPD can be assigned to them. In some embodiments, the default CPD is not scalable and/or not switchable. Some further embodiments can use descriptions comprising additional information.

In further embodiments, CPD information for a component can be configured via a user interface, e.g., a graphical user interface or a command-line interface.

One or more CPD instances can be grouped into a logical organization called a design power domain (DPD). In some embodiments, a DPD can, like a CPD, comprise a scalability indicator (such as, for example, comprising a Boolean value and a voltage range) and a switchability indicator. In further embodiments, CPD instances can be assigned to a DPD based on an algorithm and/or based on user input. For example, in some embodiments, CPD instances can be assigned to one or more DPDs based on scalability values for the CPD instances.

Figure 4:
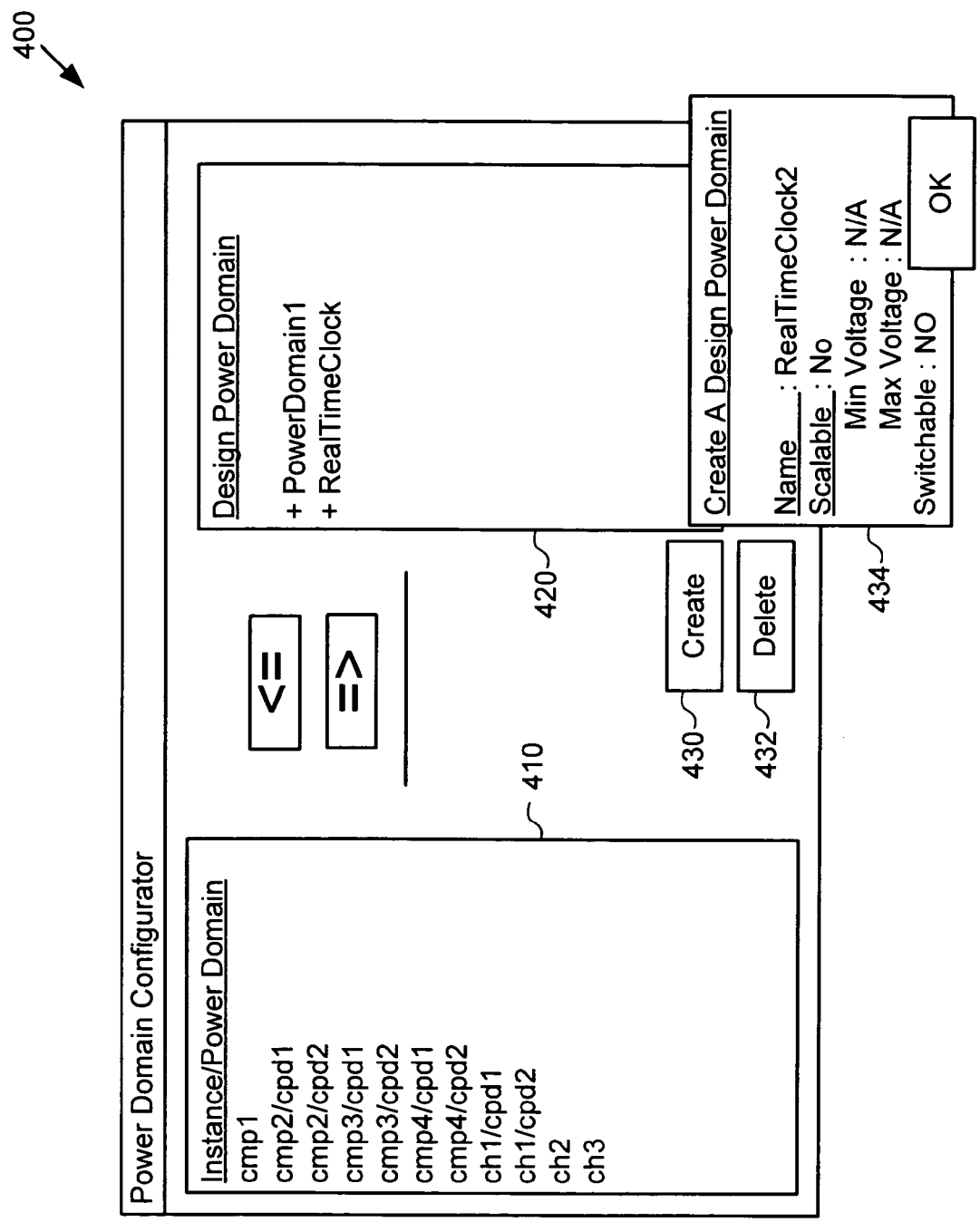
FIG. 4 shows one embodiment of a user interface for creating DPDs and managing CPDs and DPDs.

FIG. 4 shows one embodiment of a user interface (UI) 400 for creating DPDs and managing CPDs and DPDs. Lists 410, 420 display the existing CPD instances and the existing DPDs, respectively. For example, list 410 indicates (among others) that instances of CPD1 and CPD2 are assigned to component cmp3, and that no CPD instances are explicitly assigned to component cmp1. (However, as mentioned above, in some embodiments if no CPD instance is explicitly assigned to a component or channel, a default CPD can be assigned to the component or channel.) UI elements such as buttons 430, 432 can be used to create or delete a DPD. In the depicted user interface 400, clicking on the create button 430 can cause a dialog box 434 to appear, in which a user can indicate properties for a new DPD, such as a name, scalability and switchability indicators, and minimum and maximum voltages. If a DPD is indicated as being non-scalable, a single voltage can be provided (e.g., the maximum and minimum voltages can be set to the same value). Alternatively, the EDA tool can be configured to assume that one voltage or the other is to be always used for the DPD. In further embodiments, for a DPD indicated as being scalable, setting the maximum and minimum voltages both to zero can be used to indicate an unlimited voltage range. In the example embodiment shown here, the list 420 shows two DPDs: "PowerDomain1" and "RealTimeClock." For the purposes of this example, "PowerDomain1" is a default DPD. In some embodiments, a multiple number of DPDs can be created.

Figure 5:
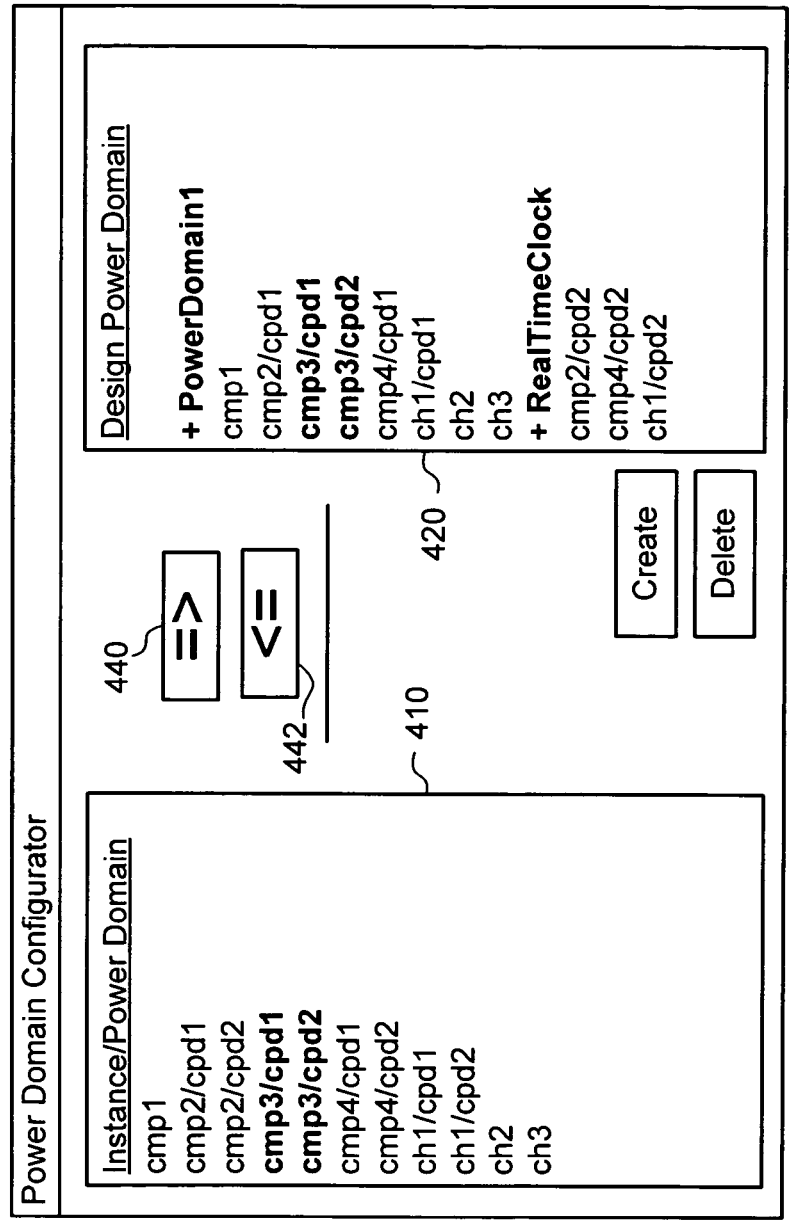
FIG. 5 shows the user interface of FIG. 4 displaying CPD instances assigned to DPDs.

FIG. 5 shows the user interface 400 displaying CPD instances assigned to DPDs. In this particular embodiment, the nomenclature [element name]/[CPD name] indicates the instance of a particular CPD assigned to a particular element. For example, "cmp3/cpd2" indicates the instance of CPD2 assigned to component cmp3. In this embodiment, where only a component or channel label is listed (e.g., "cmp1"), this indicates that an instance of the default CPD is assigned to this component or channel.

In FIG. 5, the exemplary list 420 shows that the CPD instances cmp2/cpd2, cmp4/cpd2 and ch1/cpd2 are assigned to the DPD "RealTimeClock." The list 420 also shows that the remaining CPD instances (including instances of the default CPD) are assigned to the default DPD, "PowerDomain1." CPD instances can be assigned to (or unassigned from) a DPD by selecting the instance name and then "moving" the instance onto or off of the list 420, such as by using user interface buttons 440, 442. Other user interfaces can be used for assigning CPD instances to a DPD.

In some embodiments, it is possible for two or more CPD instances with "conflicting" properties to be assigned to the same DPD. For example, an instance of a first CPD can have a different voltage range than an instance of a second CPD. Some embodiments of an EDA tool can apply one or more compatibility rules to "validate" a given set of CPD instances assigned to a DPD. The following are some non-limiting, examplary rules that an embodiment of an EDA tool can apply to resolve possible conflicts:
- If a DPD is switchable, all CPD instances assigned to the DPD must also be switchable.
- If a DPD is not switchable, then a CPD instance can be assigned to that DPD regardless of the switchability of the CPD.
- If a DPD is scalable, then: CPDs for CPD instances assigned to the DPD must be scalable; the maximum voltages of the CPDs must be equal to or greater than the maximum DPD voltage; and the minimum voltage of the CPDs must be equal to or less than the minimum DPD; or, both the maximum and minimum CPD voltages must be equal to zero (indicating an unlimited range for the CPD).
- If a DPD is not scalable, the minimum voltage is always or almost always used by the DPD. In some embodiments, the maximum and minimum voltages of a non-scalable DPD must match.
- If a DPD is not scalable, an instance of a scalable CPD can be added to the DPD if the minimum and maximum voltages of the CPD encompass the DPD voltage setting.
- If a DPD is not scalable, then an instance of a non-scalable CPD can be added if the CPD voltage setting matches the DPD voltage setting.
* The default CPD and DPD are switchable and scalable. The default CPD and DPD have an unlimited voltage range (this can be indicated by, e.g., setting the minimum and maximum voltages to 0).

In some embodiments, the EDA tool can be configured to resolve one or more conflicts by altering properties of one or more CPDs and/or DPDs. For example, an assignment of a CPD instance can be changed from a first DPD to a second DPD. Alternatively, the EDA tool can present an error message to a user and allow a user to resolve a conflict. Other, alternative rules can be created and applied to assignments of a CPD instance to a DPD.

Figure 6:
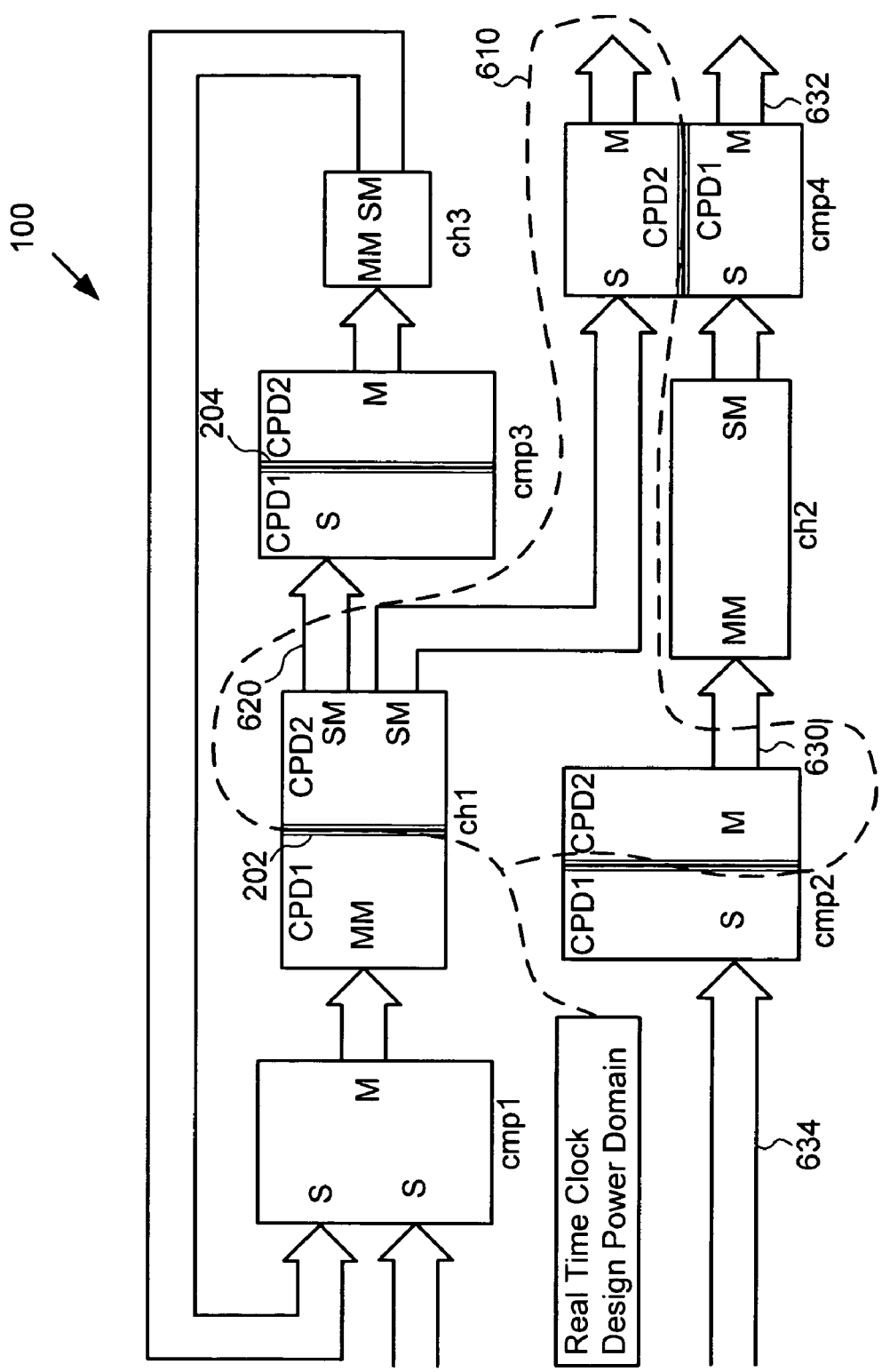
FIG. 6 shows an exemplary electronic circuit design with one embodiment of a conceptual boundary domain loop.

FIG. 6 shows the electronic design 100 of FIGS. 1 and 2 with one embodiment of a conceptual boundary domain loop 610 drawn according to the list 420 of FIG. 5. More specifically, line 610 provides a visual indication of CPD instances assigned to the RealTimeClock DPD (in this case, ch1/cpd2, cmp2/cpd2 and cmp4/cpd2). The remaining CPD instances in the design (including instances of the default CPD) are shown as being assigned to the default DPD PowerDomain1 (e.g., by their position outside of the loop 610).

Exemplary Embodiments of a Power Domain Interface Component

Figures such as FIG. 6 can, in some embodiments, indicate data connections in the design that pass from a first DPD to a second DPD. Examples of such connections are indicated at connections 620, 630. Data signals that cross from one DPD to another DPD can, in some cases, be interpreted incorrectly by components or channels in the other DPD. For example, in some embodiments a first component in a first DPD of a design operating at a scaled-down voltage can provide a '1' signal at a relatively high voltage to a second component in a second DPD of the design. If the second component is operating at a higher voltage and receives the signal in an unbuffered state, it can erroneously interpret the signal as being a '0'. Accordingly, it can be useful to generate one or more power domain interface (PDI components (sometimes referred to herein as a "boundary circuit design elements"), which can be configured to correctly interpret signals between DPDs. The PDI components can then be inserted into the design at interfaces between two DPDs.

Generally, in one specific exemplary approach involving a design with N DPDs, a maximum of $$\frac{(N-1)N}{2}$$

PDI components are needed. This expression can be derived as follows: In a design with two DPDs (A, B), conceptually one PDI component is needed to interface DPD A to DPD B, and another component to connect DPD B to DPD A. In embodiments where a PDI component is bi-directional, these two PDI components can be bundled together into the same PDI component.

In a design with three DPDs (A, B, C), conceptually PDI components are required from A to B and from A to C; from B to A and B to C; and from C to A and C to B. Again, given bidirectional PDI components, the A to B and B to A signals, and so forth, can be bundled together into the same component.

Thus, for an overall design with N DPDs, there are potentially connections to all other DPDs (i.e., (N-1)N). This figure is then halved because the PDI components are presumed to be bi-directional.

In some embodiments, one or more PDI components can be created individually by a user. For example, the user can provide a detailed description of how signals are handled between domains, and the EDA tool can construct a PDI component accordingly. The user can also provide information concerning PDI control signals, including whether the signals are input or output signals, as well as how those signals are connected in the overall circuit design.

In other embodiments, individual or multiple PDI components (e.g., all PDI components for a design) can be generated automatically according to one or more templates. Accordingly, in some embodiments the use of templates can make incorporation of power domains into a design faster and more efficient. Generally speaking, a template can provide a connection policy containing one or more descriptions of how signals from the DPDs are to be handled in a PDI component. Electronic design generation using templates is well known in the art, and in some embodiments a template used to generate a PDI component can be conceptually similar to a template used for a design controller, design arbitration, bus decoding, etc. The content of template can vary with, for example, one or more design objectives. In some embodiments, a template contains control signal information. In other embodiments a template contains an indicator of the language or languages the PDI component will be generated in, which can ease the PDI component's integration into a design.

Figure 7:
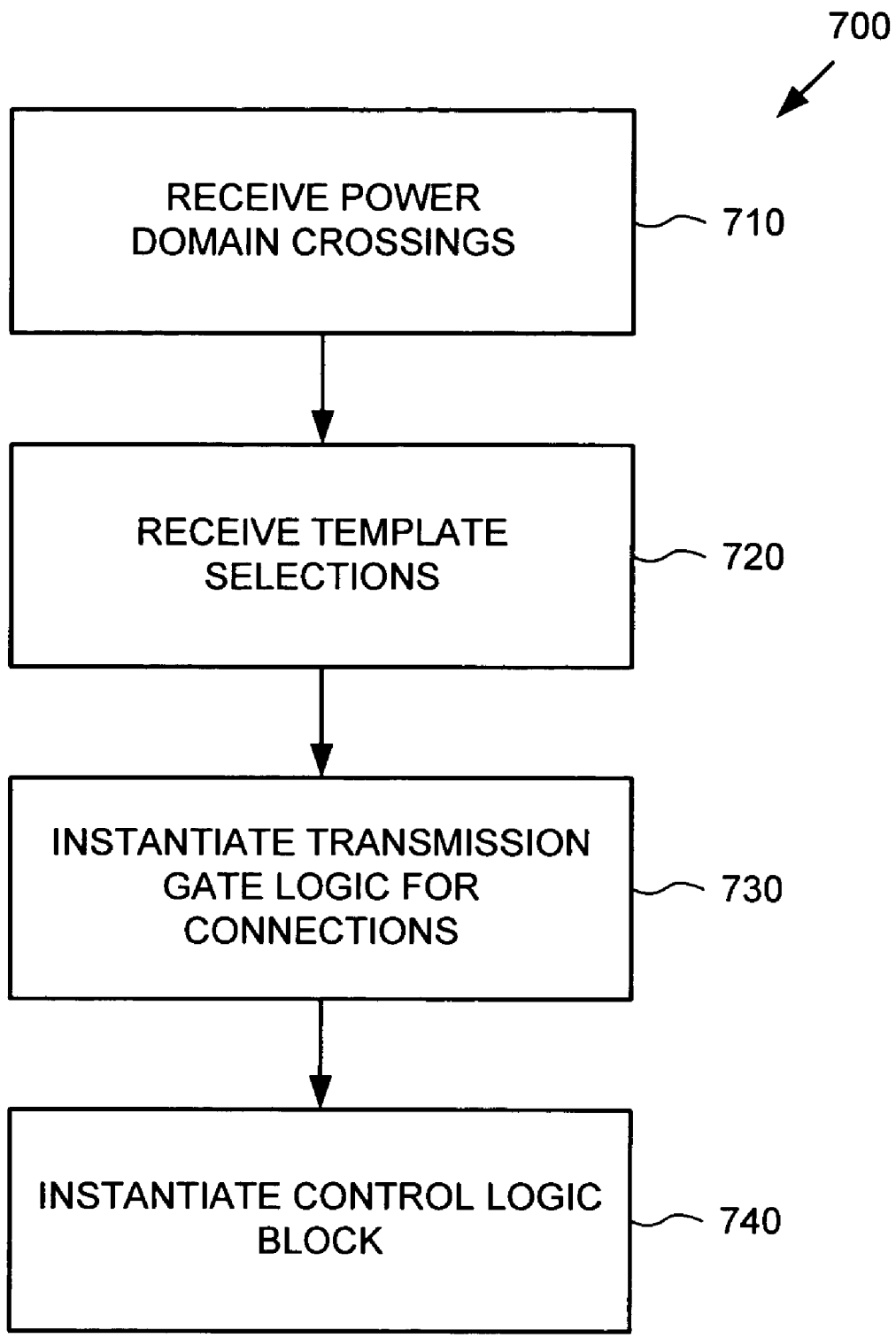
FIG. 7 shows a flowchart of one embodiment of a method of adding a PDI component to an electronic design.

FIG. 7 shows a flowchart of one exemplary embodiment of a method 700 of adding a PDI component to an electronic design. A list of power domain crossings is received (step 710). This list can be provided by the user or by an EDA tool. A template selection is received (step 720) from a user or from the EDA tool. Using the received template, transmission gate logic for one or more signals crossing the DPD boundaries is instantiated in the design (step 730), and a control logic block for the PDI component is instantiated in the design (step 740). Adding the control logic block can increase the number of pins in PDI component. In some embodiments, one control logic block is instantiated for all PDI components in the electronic design. In other embodiments, multiple control logic blocks are instantiated.

Figure 8:
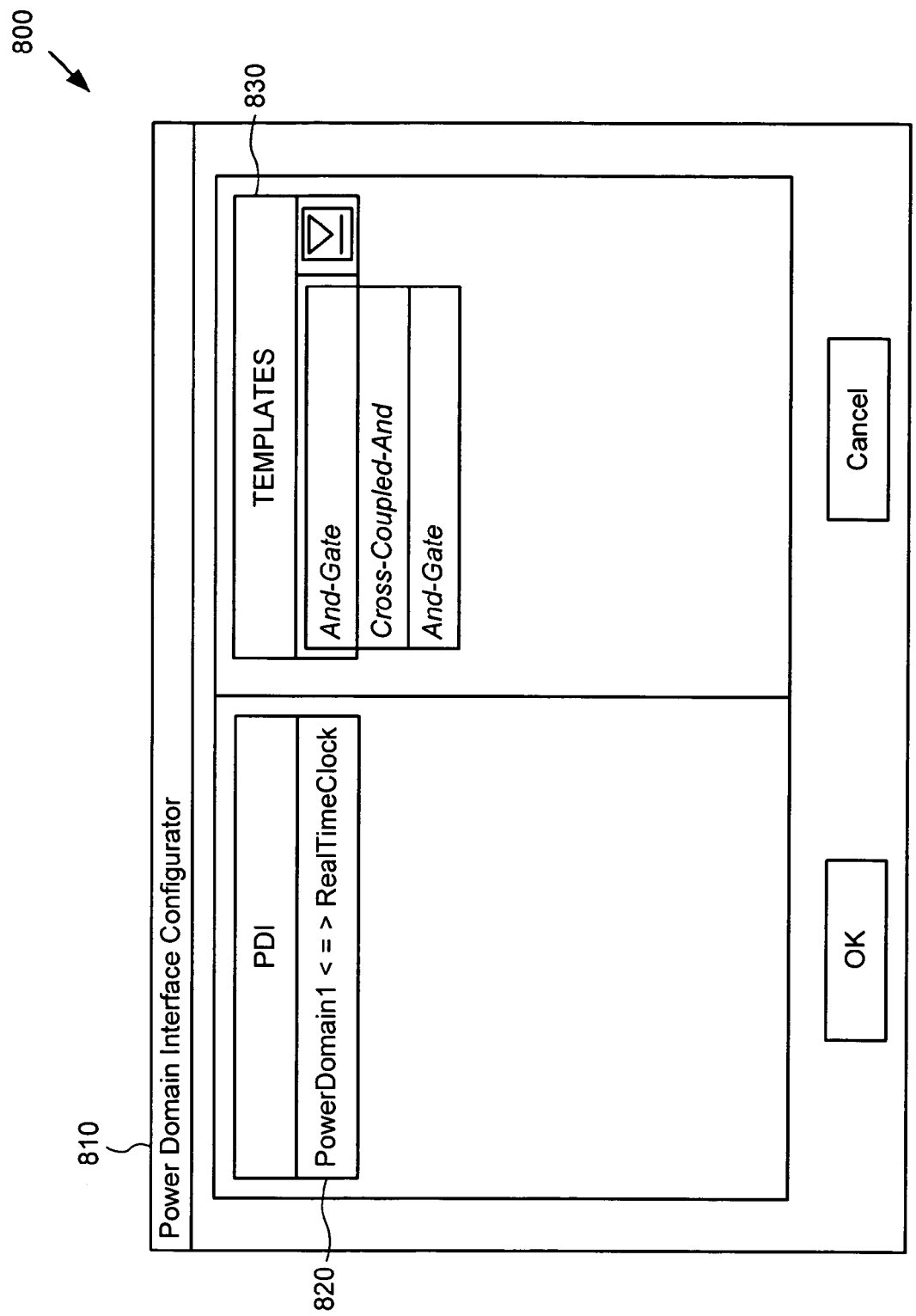
FIG. 8 shows one embodiment of an exemplary user interface for selecting a template for generating a PDI component.

FIG. 8 shows one embodiment of a user interface 800 for selecting a template for generating a PDI component. The UI 800 comprises a dialogue box 810, the dialogue box further comprising a list 820 of DPD interfaces and a list 830 of template interfaces. A user can select a template for a corresponding DPD interface. In the depicted embodiment, a template "And-Gate" or "Cross-Coupled-And" can be selected for the DPD interface "PowerDomain1<=>RealTimeClock." Other user interfaces can also be used.

FIG. 9 shows one embodiment of a description 900 of a template for generating a PDI component. (This embodiment is written in XML, but other embodiments can use other formats.) The description 900 comprises a section 910 of external signals, in addition to the transmission signals crossing the DPD boundaries, to be added to the PDI component. Those of ordinary skill in the art will recognize that the number and type of external signals can vary. A section 920 comprises code (e.g., HDL or similar code) which describes the functions of the control logic block(s). A section 930 describes handling of one or more transmission signals. In some embodiments, a template causes transmission gate logic to be instantiated identically for every transmission signal. In other embodiments, a template causes transmission gate logic to be instantiated differently for at least some transmission signals.

Figure 10:
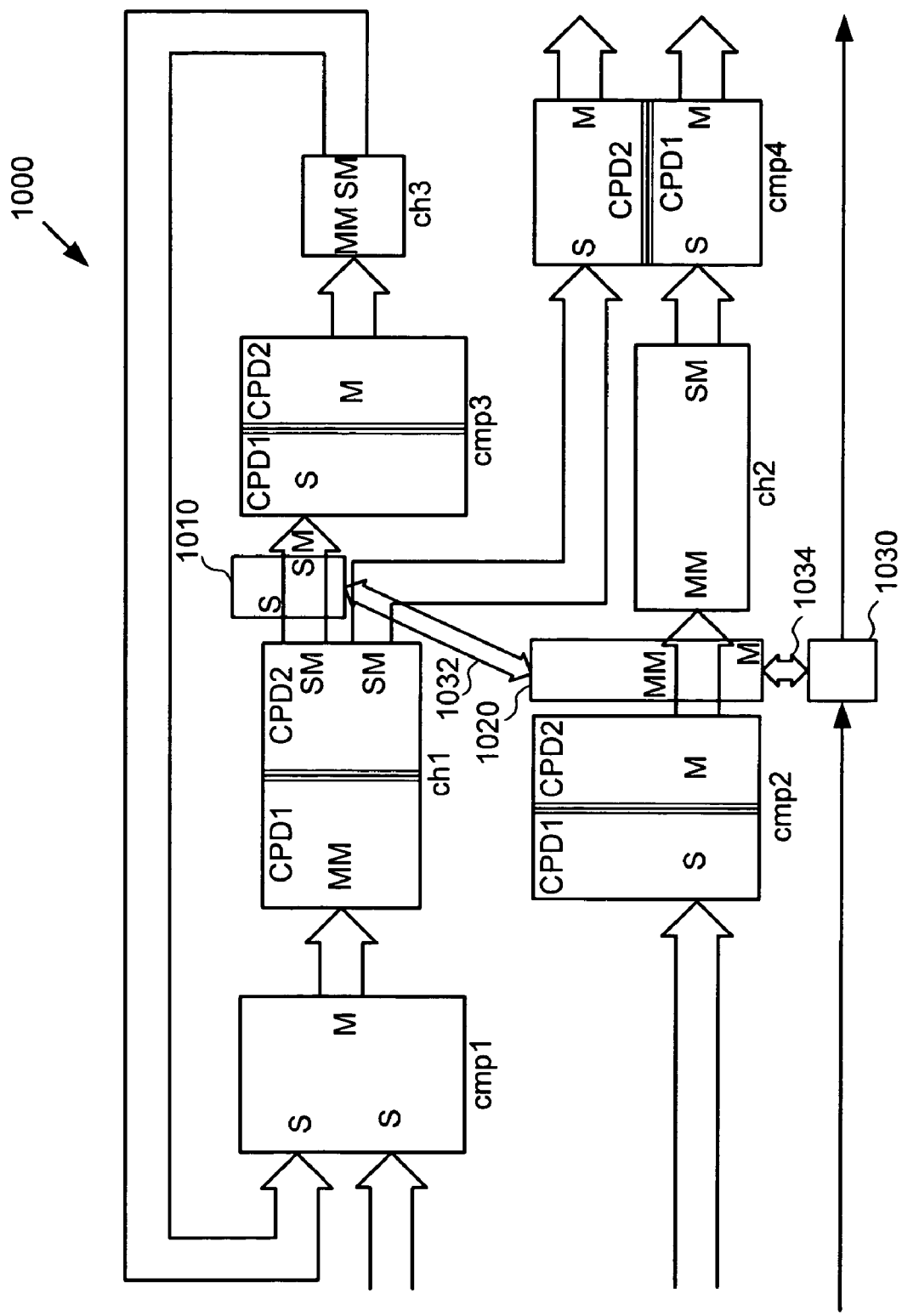
FIG. 10 shows a block diagram of an exemplary electronic circuit design.

FIG. 10 shows a block diagram of one embodiment of an electronic design 1000, which is similar to the electronic design 100 of FIG. 1. In addition to the components and channels shown in previous figures, electronic design 1000 further comprises a PDI component placed at the boundary between the DPDs. The PDI component is shown in this figure as two separate PDI components 1010, 1020, but functionally they are one component handling signals passing between the DPDs. In other embodiments, however, they can be structured as two separate components. A PDI component can be configured to handle one or more signals. A control block 1030 provides control signals for the PDI components 1010, 1020. In some embodiments, additional signals, such as control1 and testOut, are used by control block 1030. In FIG. 10, arrows 1032, 1034 represent one or more signals (e.g., control signals) passing between the control block 1030 and the PDI components 1010, 1020. In the embodiment shown in FIG. 10, the PDI components 1010, 1020 comprise interfaces complementary to the interfaces of the respective components and channels to which the PDI components 1010, 1020 are logically adjacent. For example, PDI component 1010 comprises an S interface and an SM interface, which can interface with an SM interface of channel ch1 and the S interface of component cmp3, respectively. PDI component 1020 comprises an MM interface and an M interface, which can interface with the M interface of component cmp2 and the MM interface of channel ch2, respective.

Some EDA tool embodiments can require that the PDI component be wrapped in an HDL file (or a file in a similar language) to create an ad-hoc component. A PDI template can be used to generate the HDL file.

Exemplary Embodiments of the Disclosed Method

Figure 11:
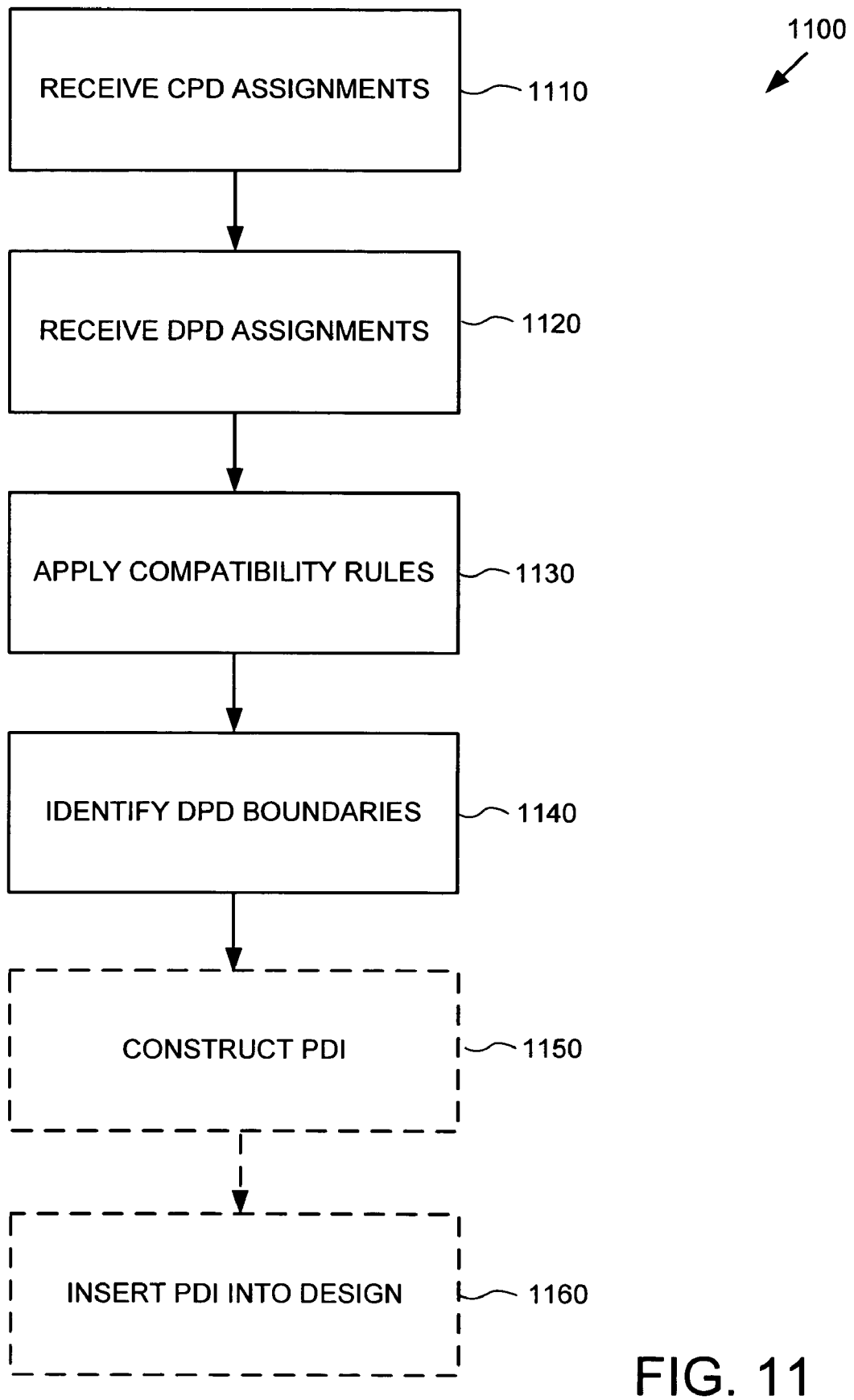
FIG. 11 shows a flowchart of one embodiment of a method for power domain handling in an electronic design.

FIG. 11 shows a flowchart of one embodiment of a method 1100 for power domain handling in an electronic design. CPD assignments are received (step 1110) and DPD assignments are received (step 1120). Compatibility rules can be applied to the DPD assignments (step 1130), and one or more boundaries between DPDs can be identified in the design (step 1140). The compatibility rules can comprise, for example, one or more of the rules discussed above. A PDI can be constructed (step 1150). In some embodiments the PDI in constructed according to the method 700 described above. The PDI can be inserted into the electronic design (step 1160). In some embodiments, the electronic design can be represented as an HC. Information regarding any CPDs and DPDs in the HC can be included in a descriptor of the HC.

Exemplary Computing Environment

Figure 12:
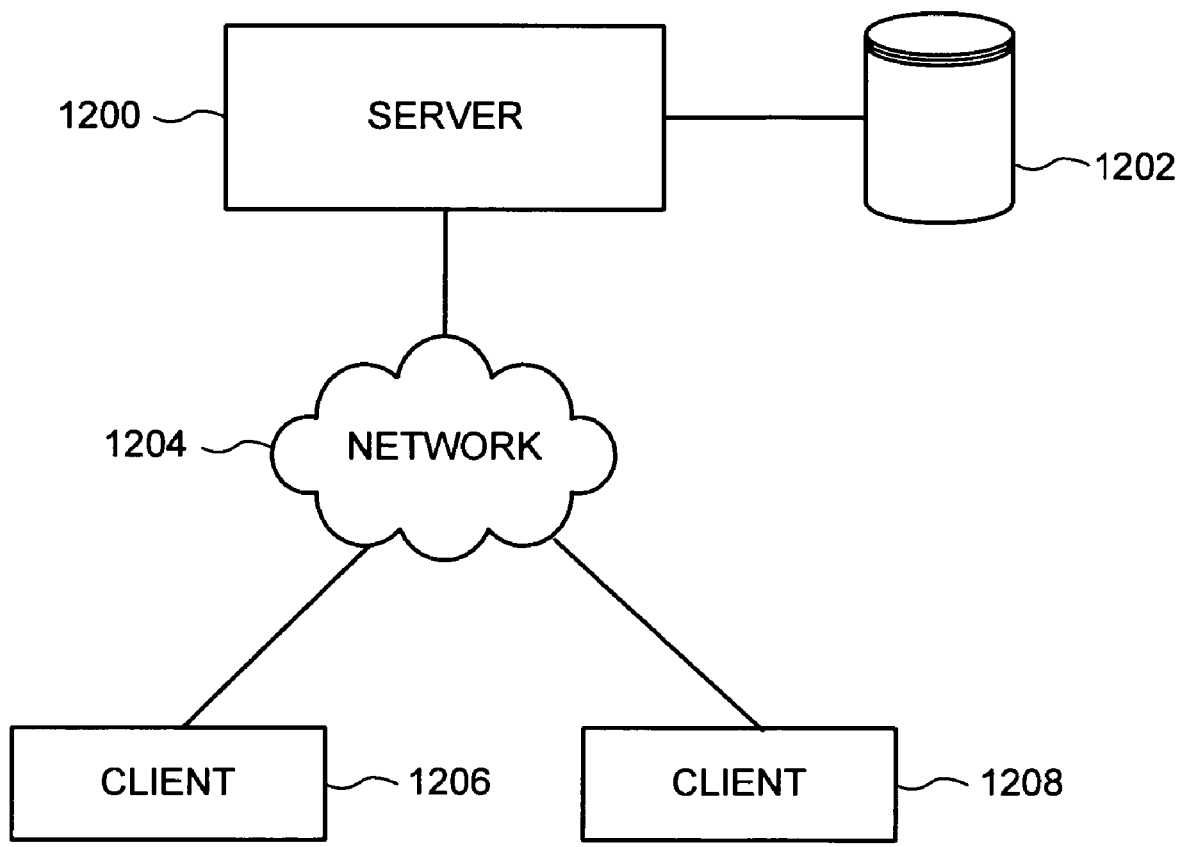
FIG. 12 is a diagram illustrating an exemplary client-server network environment.

Any of the aspects of the technology described above can be performed or designed using a distributed computer network. FIG. 12 shows one such exemplary network. A server computer 1200 can have an associated storage device 1202 (internal or external to the server computer). For example, the server computer 1200 can be configured to process EDA information related to electronic designs using any of the embodiments described above (e.g., as part of an EDA tool). The server computer 1200 can be coupled to a network, shown generally at 1204, which can comprise, for example, a wide-area network, a local-area network, a client-server network, the Internet, or other such network. One or more client computers, such as those shown at 1206, 1208, can be coupled to the network 1204 using a network protocol.

Figure 13:
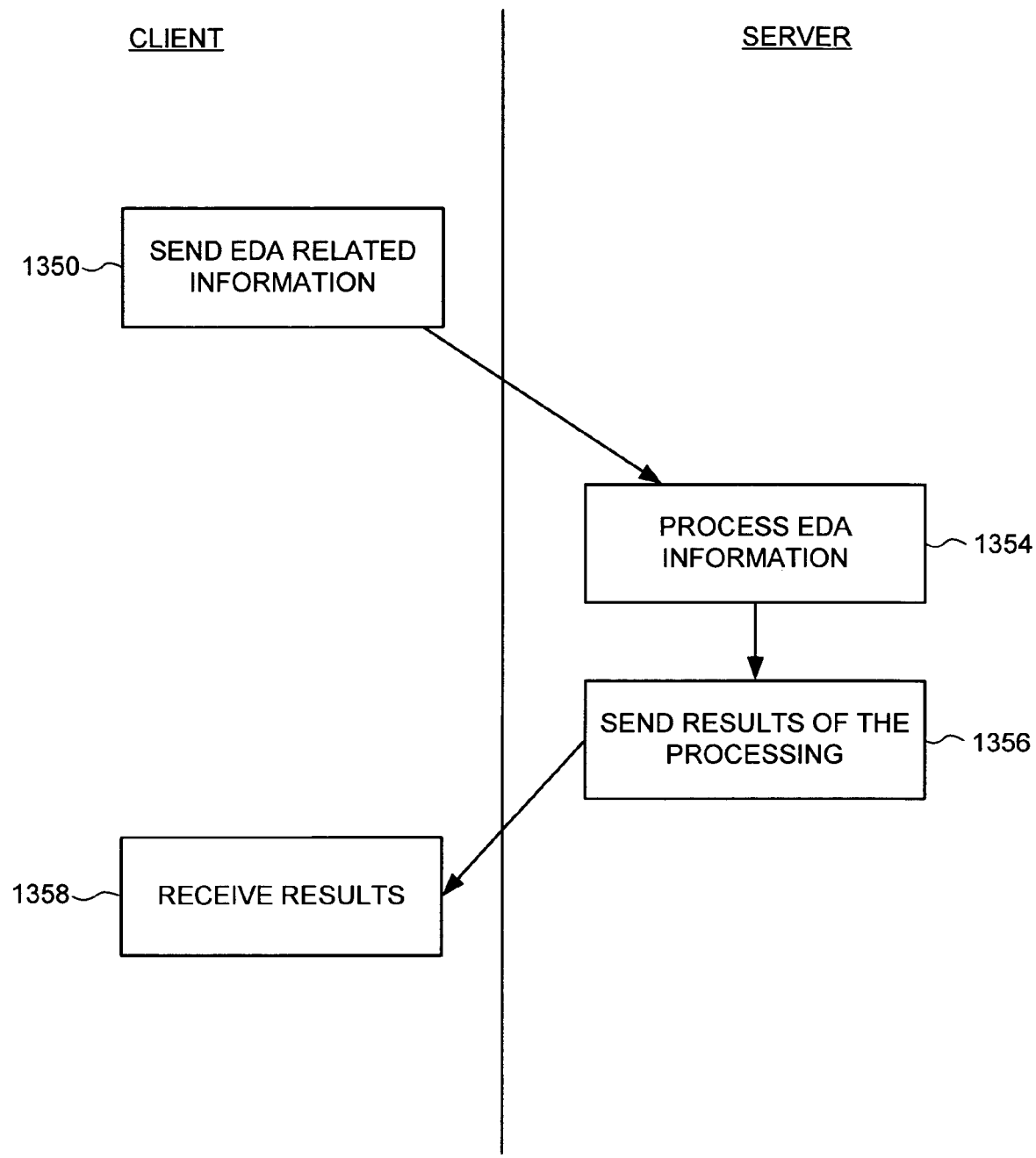
FIG. 13 is a diagram illustrating an exemplary method of exchanging electronic design automation information using a client-server network, such as the one illustrated in FIG. 12.

FIG. 13 shows one embodiment in which a client computer (e.g., computers 1206 and 1208 of FIG. 12) can receive results (e.g., power domain information) related to processing EDA related information (e.g., power domain rules) according to any of the embodiments disclosed herein using a remote server computer, such as the server computer 1200 shown in FIG. 12. In step 1350, for example, a client computer sends data related to EDA. For instance, a client computer can send a rule file, one or more proposed IC design layouts and other EDA information from a design database. In step 1354, the data is received by the server computer and processed according to any of the disclosed embodiments. In step 1356, the server computer sends the results (e.g., revised electronic circuit designs) to the client computer, which receives the results in step 1358.

Having described and illustrated the principles of the disclosed technologies with reference to the illustrated embodiments, it will be recognized that the illustrated embodiments can be modified in arrangement and detail without departing from such principles. For example, elements of the illustrated embodiment shown or described in software can be implemented in hardware and vice versa. Also, the technologies from any example can be combined with the technologies described in any one or more of the other examples. Thus, for instance, any method, process, system, or tool described herein with respect to power domains can be used in conjunction with other EDA related information for other EDA uses in other EDA related tools. In view of the many possible embodiments to which the principles of the technologies can be applied, it should be recognized that the illustrated embodiments are examples and should not be taken as a limitation on the scope of the invention. For instance, various components of systems and tools described herein can be combined in function and use. We therefore claim as our invention all subject matter that comes within the scope and spirit of these claims.

We claim:

1. A computer-implemented method for generating an electronic circuit design, the electronic circuit design comprising one or more circuit design elements, the method comprising:

receiving a description of a first set of power domain instances, wherein the first set of power domain instances have respective power domain properties and are assigned to one or more of the one or more circuit design elements in the electronic circuit design;

receiving a description of a second set of power domain instances, wherein the second set of power domain instances have respective power domain properties and are assigned to one or more of the instances of the first set of power domain instances;

applying one or more compatibility rules to the description of the first set of power domain instances and the description of the second set of power domain instances;

identifying, according to the applied one or more compatibility rules, conflicting respective power domain properties among first and second power domain instances of the first set of power domain instances, the first and second power domain instances being assigned to a third power domain instance of the second set of power domain instances;

resolving the identified conflicting respective power domain properties by modifying at least one of the first power domain instance, the second power domain instance, and the third power domain instance; and storing in one or more computer-readable media a description of the modified at least one of the first power domain instance, the second power domain instance, and the third power domain instance.

2. The method of claim 1, further comprising adding to the electronic circuit design, according to one or more templates, one or more boundary circuit design elements for handling one or more transmission signals crossing from a fourth power domain instance of the second set of power domain instances to the third power domain instance.

3. The method of claim 2, wherein creating one or more boundary circuit design elements comprises:

instantiating in the electronic design transmission gate logic for the one or more transmission signals; and instantiating in the electronic design one or more blocks of control logic.

4. The method of claim 1, wherein the first set of power domain instances comprises a default power domain.

5. The method of claim 1, wherein the second set of power domain instances comprises a default power domain.

6. The method of claim 5, further comprising assigning one or more circuit design elements to a default power domain.

7. The method of claim 5, wherein the default power domain is a switchable and a scaleable power domain.

8. The method of claim 1, wherein the respective power domain properties of the first power domain instance comprise a first switchability indicator and the respective power domain properties of the second power domain instance comprise a second switchability indicator, and wherein applying one or more compatibility rules comprises comparing the first and second switchability indicators.

9. The method of claim 1, wherein the respective power domain properties of the first power domain instance comprise a first voltage range indicator and the respective power domain properties of the second power domain instance comprise a second voltage range indicator, and wherein applying one or more compatibility rules comprises comparing the first and second voltage range indicators.

10. The method of claim 1, wherein an integrated circuit is made according to the method.

11. A computer-readable storage medium containing a data structure describing a first power domain for a first element in an electronic design, the data structure comprising:

indicators of one or more bus interfaces associated with the first power domain;

indicators of one or more signals associated with the first power domain;

a scalability indicator indicating whether a power domain voltage for the first power domain can be scaled; and a switchability indicator indicating whether the first power domain can be switched on and off, wherein one or more of the indicators of one or more bus interfaces associated with the power domain, the indicators of one or more signals associated with the power domain, the scalability indicator indicating whether the power domain voltage can be scaled, and the switchability indicator indicating whether the power domain can be switched on and off, have been modified to resolve a conflict between the first power domain for the first element in the electronic design and a second power domain for a second element in the electronic design, wherein the conflict was identified by applying one or more compatibility rules to the electronic design.

12. The computer-readable storage medium of claim 11, wherein the data structure is described using a mark-up language.

13. The computer-readable storage medium of claim 11, wherein the scalability indicator comprises an approximate minimum voltage for the first power domain and an approximate maximum voltage for the first power domain.

14. The computer-readable storage medium of claim 13, wherein the approximate minimum voltage for the first power domain and an approximate maximum voltage for the first power domain are approximately equal.

15. The computer-readable storage medium of claim 11, wherein the data structure further comprises a power domain name.

16. A system comprising:
a processor; and
a computer-readable storage medium comprising instructions configured to cause the processor to perform a method for modifying an electronic circuit design, the method comprising:
displaying a graphical user interface configured to:
display a first set of power domain instances assigned to one or more circuit design elements in the electronic circuit design;
display a second set of power domain instances; and
receive from a user, using the graphical user interface, one or more assignments of the first set of power domain instances to the second set of power domain instances;
applying one or more compatibility rules to the received one or more associations; and
identifying one or more power domain boundaries in the circuit design based on the assignments of the first set of power domain instances to the second set of power domain instances.

17. The system of claim 16, wherein the method further comprises adding to the electronic circuit design, according to one or more templates, one or more boundary circuit design elements for handling one or more signals crossing from a first member of the second set of power domain instances to a second member of the second set of power domain instances.

18. The system of claim 17, wherein adding to the electronic circuit design one or more boundary circuit design elements comprises:
receiving one or more indications of the one or more common boundaries;
receiving a selection of a template, the template comprising signal connection information;
generating transmission gate logic designs for at least some of the one or more signals at the common boundaries; and
generating control logic designs.

19. The system of claim 18, wherein the template is provided in a mark-up language description.

20. The system of claim 17, the method further comprising inserting into the electronic design the one or more boundary circuit design elements.

* * * * *

UNITED STATES PATENT AND TRADEMARK OFFICE
CERTIFICATE OF CORRECTION

PATENT NO. : 7,574,683 B2 Page 1 of 1
APPLICATION NO. : 11/499036
DATED : August 11, 2009
INVENTOR(S) : Wilson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this

Seventh Day of September, 2010

David J. Kappos
*Director of the United States Patent and Trademark Office*